(12) United States Patent
Nagel et al.

(10) Patent No.: US 11,814,021 B2
(45) Date of Patent: Nov. 14, 2023

(54) ELECTROMECHANICAL BRAKE BOOSTER AND METHOD FOR MANUFACTURING AN ELECTROMECHANICAL BRAKE BOOSTER

(71) Applicant: Robert Bosch GmbH, Stuttgart (DE)

(72) Inventors: Willi Nagel, Remseck/Hochdorf (DE); Andre Bollwerk, Yokohama (JP)

(73) Assignee: ROBERT BOSCH GMBH, Stuttgart (DE)

( * ) Notice: Subject to any disclaimer, the term of this patent is extended or adjusted under 35 U.S.C. 154(b) by 495 days.

(21) Appl. No.: 17/252,219

(22) PCT Filed: Jun. 6, 2019

(86) PCT No.: PCT/EP2019/064812
§ 371 (c)(1),
(2) Date: Dec. 14, 2020

(87) PCT Pub. No.: WO2020/011457
PCT Pub. Date: Jan. 16, 2020

(65) Prior Publication Data
US 2021/0245724 A1 Aug. 12, 2021

(30) Foreign Application Priority Data
Jul. 11, 2018 (DE) .......................... 102018211549.4

(51) Int. Cl.
*B60T 13/74* (2006.01)
*B60T 7/04* (2006.01)
*B60T 8/40* (2006.01)

(52) U.S. Cl.
CPC ............ *B60T 13/745* (2013.01); *B60T 7/042* (2013.01); *B60T 13/746* (2013.01);
(Continued)

(58) Field of Classification Search
CPC .............................. B60T 13/745; B60T 13/746
See application file for complete search history.

(56) References Cited

U.S. PATENT DOCUMENTS 8,874,343 B2 * 10/2014 Anderson ............. B60T 13/745
303/114.3
9,139,186 B2 * 9/2015 Vollert ................... B60T 13/745
(Continued)

FOREIGN PATENT DOCUMENTS

CN 103802813 A 5/2014
CN 108025728 A 5/2018
(Continued)

OTHER PUBLICATIONS

International Search Report for PCT/EP2019/064812, dated Sep. 6, 2019.

*Primary Examiner* — Michael Leslie
(74) *Attorney, Agent, or Firm* — NORTON ROSE FULBRIGHT US LLP; Gerard Messina

(57) ABSTRACT

An electromechanical brake booster for a braking system of a vehicle. The brake booster includes a spindle nut that is movable into rotation using an electric motor that is intrinsic or external to the brake booster, a spindle situated at the spindle nut and rotatably fixedly held using a support plate in such a way that the spindle and the support plate are movable into pure translatory motion using the spindle nut that is moved into rotation, and a reaction disk receiving element that is also movable using the support plate that is moved into pure translatory motion. The reaction disk receiving element includes a receiving opening in which a reaction disk is situated. The support plate and the reaction disk receiving element are designed as a one-piece component. A method for manufacturing an electromechanical brake booster for a braking system of a vehicle, is also described.

10 Claims, 3 Drawing Sheets

(52) U.S. Cl.
CPC ....... *B60T 8/4077* (2013.01); *B60Y 2400/301* (2013.01); *B60Y 2400/81* (2013.01); *B60Y 2410/132* (2013.01)

(56) References Cited

U.S. PATENT DOCUMENTS

| | | | |
|---|---|---|---|
| 9,409,558 B2* | 8/2016 | Pfeiffer | B60T 13/745 |
| 10,611,353 B2* | 4/2020 | Panunzio | B60T 13/745 |
| 10,703,350 B2* | 7/2020 | Knechtges | B60T 13/745 |
| 11,066,052 B2* | 7/2021 | Panunzio | B60T 13/74 |
| 2011/0178687 A1 | 7/2011 | Anderson et al. | |

FOREIGN PATENT DOCUMENTS

| | | |
|---|---|---|
| DE | 102015217528 A1 | 3/2017 |
| DE | 102015226508 A1 | 6/2017 |
| JP | 2013545672 A | 12/2013 |

\* cited by examiner

ELECTROMECHANICAL BRAKE BOOSTER AND METHOD FOR MANUFACTURING AN ELECTROMECHANICAL BRAKE BOOSTER

FIELD

The present invention relates to an electromechanical brake booster for a braking system of a vehicle. Moreover, the present invention relates to a method for manufacturing an electromechanical brake booster for a braking system of a vehicle.

BACKGROUND INFORMATION

FIGS. 1a and 1b show schematic overall and partial illustrations of a conventional brake booster that is internal related art.

The conventional brake booster schematically illustrated in FIGS. 1a and 1b includes a spindle nut 10 that is movable into a rotating motion with the aid of an electric motor (not illustrated) that is connected to spindle nut 10 and that cooperates with a hollow spindle 12. Hollow spindle 12 is rotatably fixedly held with the aid of a support plate 14 in such a way that spindle 12 and support plate 14 are movable into a translatory motion with the aid of spindle nut 10 that is movable into its rotating motion. For this purpose, two slide bushings 16, each of which is guided via a tie rod (not illustrated), are inserted in each case into a slide bushing receiving opening of support plate 14. A reaction disk receiving element 18 is clamped to support plate 14, with the aid of multiple clips 20 formed thereon, in such a way that reaction disk receiving element 18 is moved together with support plate 14 that is moved into translatory motion. Due to its clips 20, reaction disk receiving element 18 is generally made of plastic. Reaction disk receiving element 18 also includes a receiving opening in which a reaction disk 22 is situated. The translatory motion of reaction disk receiving element 18 which is triggered by the rotating motion of spindle nut 10 thus effectuates a transfer of a motor force to reaction disk 22.

As is apparent in FIG. 1a, a plunger 24 together with a pastille 26 fastened to or formed thereon extends at least partially through an inner volume of hollow spindle 12. In addition, a central opening is formed in reaction disk receiving element 18 in such a way that pastille 26, which protrudes through the central opening, may be brought into contact with reaction disk 22. Via an input rod 28 that is supported on hollow spindle 12 with the aid of a return spring 30, a driver brake force that is exerted on a brake actuating element/brake pedal may be transmitted to plunger 24 via input rod 28. The driver brake force transmitted to plunger 24 is transmittable to reaction disk 22 via pastille 26 that protrudes through the central opening.

The motor force as well as the driver brake force may be transmitted to at least one downstream piston of a master brake cylinder (not illustrated) via reaction disk 22. A pressure buildup in the master brake cylinder and at least one wheel brake cylinder connected thereto may be effectuated in this way.

A flat fitting piece 32 is fastened to plunger 24 on a side of support plate 14 directed away from spindle nut 10, flat fitting piece 32 extending perpendicularly away from plunger 24 through an inner volume that is spanned by reaction disk receiving element 18. Flat fitting piece 32 is used, among other things, as a support for a magnet 33 of a (differential) travel sensor. In the unactuated state of the electromechanical brake booster, i.e., when the motor force and the driver brake force are equal to zero, a distance A not equal to zero is present between flat fitting piece 32 and a surface of reaction disk receiving element 18 that is oriented toward the fitting piece and delimits the inner volume, and a distance B not equal to zero is present between flat fitting piece 32 and support plate 14. Distance A not equal to zero is fixed via the shape of pastille 26. Distance B not equal to zero is fixed by four plastic pins 34, each of which protrudes through an opening formed in support plate 14 and with the aid of which flat fitting piece 32 is supported by spindle nut 10 that contacts support plate 14.

SUMMARY

The present invention provides an electromechanical brake booster for a braking system of a vehicle, and a method for manufacturing an electromechanical brake booster for a braking system of a vehicle.

In accordance with an example embodiment, the present invention provides electromechanical brake boosters in which the support plate and the reaction disk receiving element are designed as a one-piece component. This is understood to mean that the support plate and the reaction disk receiving element formed on same are made of the same starting material and are designed in one piece with the aid of the same forming process. Thus, the support plate and the reaction disk receiving element are not clipped, latched, screwed, or glued to one another. Due to the "integration" of the support plate and the reaction disk receiving element into the one-piece component, the one-piece component is comparatively compact, and therefore may be advantageously used as a conventional "support plate individual part" and a "reaction disk receiving element individual part" according to the related art in the particular electromechanical brake boosters designed with same. With regard to a more detailed description of the advantages of the one-piece component, reference is made to the following description of the figures.

In one advantageous specific embodiment of the electromechanical brake booster in accordance with the present invention, the support plate together with the reaction disk receiving element as a one-piece component is formed from a single piece of sheet metal. The one-piece component may, for example, be punched, bent, and/or deep-drawn from the single piece of sheet metal. It is thus possible to utilize comparatively simple manufacturing processes for manufacturing the support plate together with the reaction disk receiving element as a one-piece component. The one-piece component is therefore manufacturable in a relatively cost-effective manner. In addition, a one-piece component manufactured in this way has a high robustness, and thus a relatively low risk of damage during operation of the electromechanical brake booster equipped with same.

In a further advantageous specific embodiment of the electromechanical brake booster in accordance with the present invention, at least one slide bushing fastening section, in each case including a slide bushing receiving opening, is formed at an edge of the one-piece component that frames the receiving opening, at least one slide bushing being inserted into the at least one slide bushing receiving opening and being guided with the aid of a tie rod in each case. Thus, in this specific embodiment of the electromechanical brake booster, the advantages of guiding the support plate with the aid of at least one slide bushing and with the aid of at least one tie rod do not have to be sacrificed.

In the example electromechanical brake booster, a plunger with a pastille part that is fastened to or formed on same is preferably situated, at least partially, within the spindle designed as a hollow spindle in such a way that the pastille part is in or may be brought into contact with the reaction disk, a flat fitting piece that extends perpendicularly away from the plunger being fastened to or formed on same, and at least one through opening being formed in the one-piece component, through which a partial section of the flat fitting piece protrudes in each case. The flat fitting piece allows a first contact surface that may contact an associated contact surface of the reaction disk receiving element of the one-piece component, as well as a second contact surface that may contact a contact surface of the support plate of the one-piece component. Forces may thus be transmitted between the one-piece component and a component formed from the plunger, the pastille part, and the flat fitting piece.

At least one protrusion that is in or may be brought into contact with the at least one partial section of the flat fitting piece that protrudes through the at least one through opening is preferably formed at the spindle nut. It is thus easily possible to dispense with the mounting of the conventionally used plastic pins on the flat fitting piece. This simplifies manufacturing of the flat fitting piece and reduces the incurred manufacturing costs.

A magnet is preferably affixed to the at least one partial section of the flat fitting piece that protrudes through the at least one through opening. The magnet may interact with a travel sensor that is fastened to the one-piece component, adjacent to the magnet. A sensor system for reliably determining a differential travel may thus be provided in an easy and cost-effective manner.

The advantages described above are also ensured when a corresponding method for manufacturing an electromechanical brake booster for a braking system of a vehicle is carried out. It is expressly pointed out that the manufacturing method according to the specific embodiments of the electromechanical brake booster described above is refinable.

BRIEF DESCRIPTION OF THE DRAWINGS

Further features and advantages of the present invention are explained below with reference to the figures.

DETAILED DESCRIPTION OF EXAMPLE EMBODIMENTS

Figure 1A:
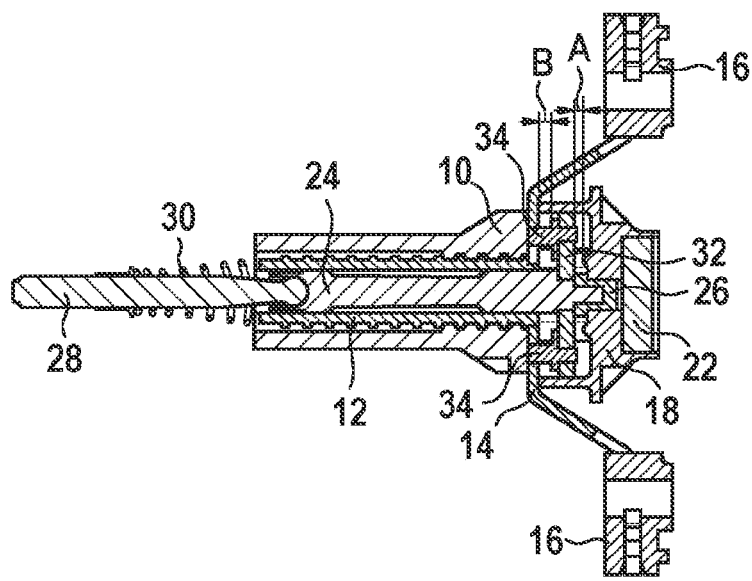
FIGS. 1a and 1b show schematic overall and partial illustrations of a conventional brake booster.
Figure 1B:
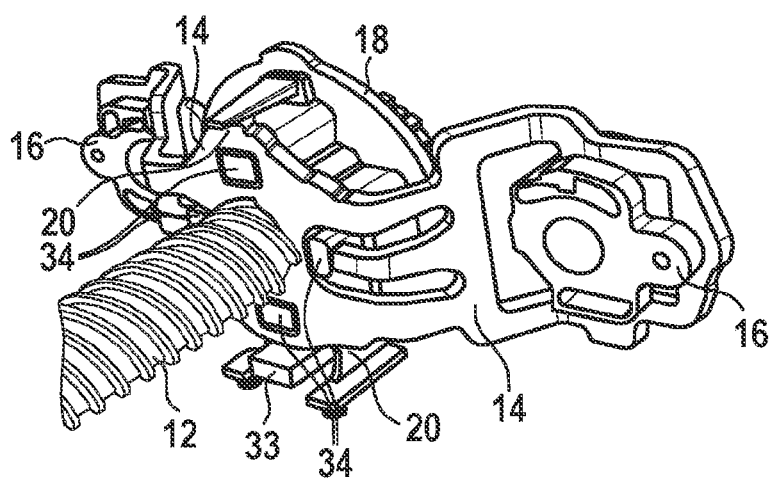
Figure 2A:
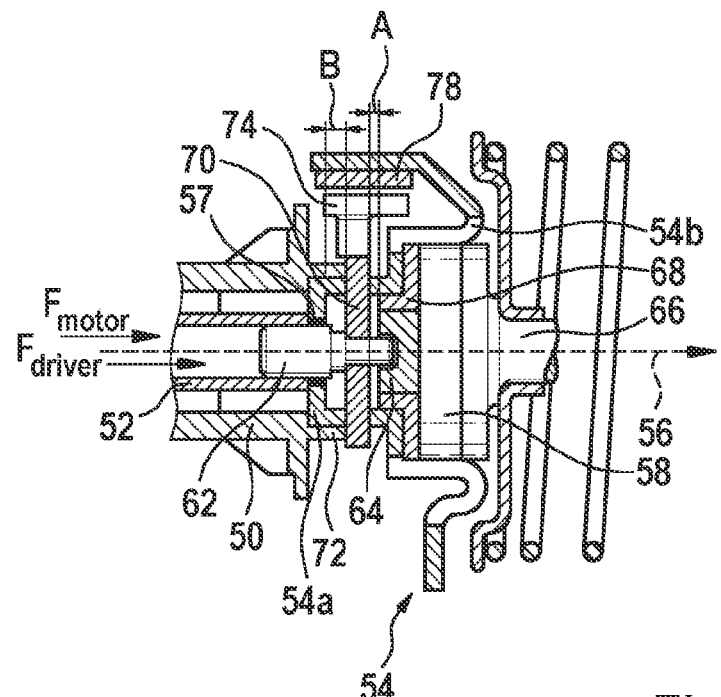
FIGS. 2a through 2c show schematic partial illustrations of one specific embodiment of the electromechanical brake booster, in accordance with the present invention.
Figure 2B:
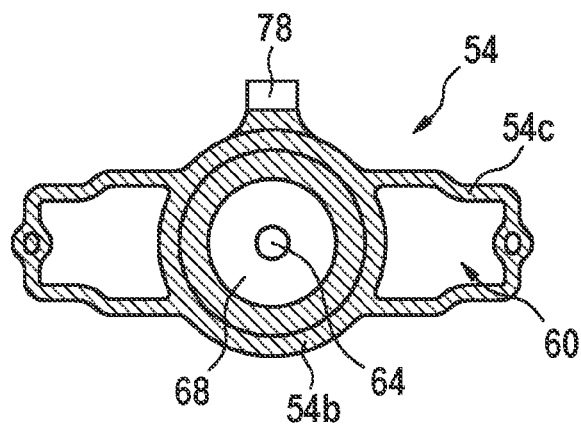
Figure 2C:
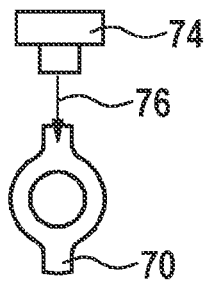

FIGS. 2a through 2c show schematic partial illustrations of one specific embodiment of the electromechanical brake booster.

The electromechanical brake booster described below may be situated upstream from a master brake cylinder of a braking system of a vehicle/motor vehicle in such a way that a motor force $F_{motor}$ of an electric motor (not illustrated) as well as a driver brake force $F_{driver}$ exerted on a brake actuating element/brake pedal (not illustrated) are transmittable to at least one displaceable piston of the master brake cylinder. It is expressly pointed out that usability of the electromechanical brake booster described below is not limited to a certain braking system type of the particular braking system, or to a particular vehicle type/motor vehicle type of the vehicle/motor vehicle.

The electromechanical brake booster includes a spindle nut 50 that is movable/moved into rotation with the aid of the electric motor. The electric motor may optionally be a motor that is intrinsic or external to the brake booster. Situated at spindle nut 50 is a spindle 52 that is rotatably fixedly held with the aid of a support plate 54a in such a way that spindle 52 and support plate 54a are movable/moved into pure translatory motion with the aid of spindle nut 50 that is moved into rotation. Motor force $F_{motor}$ of the electric motor may thus be transmitted to spindle 52 and support plate 54a in such a way that support plate 54a is displaced, corresponding to motor force $F_{motor}$ in a braking direction 56 that is closer to downstream master brake cylinder.

Support plate 54a is part of a one-piece component 54; a further portion of one-piece component 54 may also be referred to as a reaction disk receiving element 54b. Support plate 54a together with reaction disk receiving element 54b is designed as a one-piece component 54 in such a way that a "disassembly" or "separation" of support plate 54a and reaction disk receiving element 54b is not possible without a "breaking apart" or "cutting through" of one-piece component 54. One-piece component 54 together with support plate 54a and reaction disk receiving element 54b may also be referred to as an "integral reaction disk receiving element" or as a "support reaction disk receiving element." Support plate 54a together with reaction disk receiving element 54b is preferably formed as a one-piece component 54 from a single piece of sheet metal, in particular from a single piece of sheet steel. One-piece component 54 may, for example, be punched, bent, and/or deep-drawn from the single piece of sheet metal/sheet steel.

Support plate 54a may also be referred to as an anti-rotation plate (ARP). Despite the use of the term "plate" for support plate 54a, support plate 54a does not have to be understood to mean a straight element. Support plate 54a may, for example, also have a curved shape, in particular an offset shape. Spindle 52 may, for example, be welded to support plate 54a/one-piece component 54 (in particular by laser welding) with formation of a weld seam 57.

Reaction disk receiving element 54b may be understood to mean a body part that includes a suitable receiving opening for accommodating a reaction disk 58. As shown in FIG. 2a, reaction disk 58 is situated in the receiving opening of reaction disk receiving element 54b. Reaction disk receiving element 54b may also be referred to as a valve body. Reaction disk receiving element 54b, which is designed as one piece with support plate 54a, is of course movable (as part of one-piece component 54) together with the support plate that is moved into pure translatory motion, as the result of which motor force $F_{motor}$ is transmittable/transmitted to reaction disk 58 via reaction disk receiving element 54b.

By use of one-piece component 54 instead of the conventional use of a "support plate individual part" and a "reaction disk receiving element individual part" according to the related art, the clip connections described above may be dispensed with. Instead of forming reaction disk receiving element 54b from plastic, as is generally necessary in the related art, sheet metal/sheet steel may be used for one-piece component 54, which results in the advantages explained in greater detail below. Dispensing with the clip connections also ensures more compactness of one-piece component 54 compared to the conventional individual parts. In particular, a transverse force that occurs at reaction disk receiving element 54b may be easily supported on spindle 52 via support plate 54a, which is designed as part of one-piece component 54. The design of support plate 54*a* as part of one-piece component 54 also acts against occurrence of bending stresses in support plate 54*a*, and thus protects weld seam 57 from such bending stresses.

Furthermore, the use of one-piece component 54 in contrast to the conventional individual parts effectuates an "automatic" fixing of support plate 54*a* and reaction disk receiving element 54*b* to one another. In the related art, recesses are sometimes punched into the "support plate individual part" and plastic pins are fastened to the "reaction disk receiving element individual part," so that fixing of the individual parts is possible by immerging the plastic pins into the recesses of the "support plate individual part." These plastic pins may easily be dispensed with when one-piece component 54 is used. When one-piece component 54 is used, the processes, conventionally still often necessary, for forming the openings at the support plate individual part with the aid of sheet metal punching and for fastening or forming the plastic pins to/on the reaction disk receiving element individual part with the aid of plastic injection molding, are thus dispensed with. While in the related art, inaccuracy when carrying out these processes often results in imprecise adjustment of the individual parts relative to one another, such problems are eliminated with the use of one-piece component 54.

As shown in FIG. 2*b*, at least one slide bushing fastening section 54*c*, in each case including a slide bushing receiving opening 60, may be formed at an edge of one-piece component 54 that frames the receiving opening for accommodating reaction disk 58. At least one slide bushing (not illustrated) may be inserted into the at least one slide bushing receiving opening 60. The at least one slide bushing may be guided with the aid of a tie rod in each case. Spindle 52 may thus be rotatably fixedly held in a reliable manner. Reaction disk 58 of one-piece component 54 is preferably shaped in such a way that the at least one slide bushing inserted into associated slide bushing receiving opening 60 is in the "same plane" with reaction disk 58. Pronounced offset of reaction disk 58 of one-piece component 54 is not necessary. In this case, there is no concern for "twisting" of one-piece component 54 due to transverse forces, or an occurrence of bending moments at one-piece component 54.

For example, two slide bushing receiving openings 60 may be formed at two slide bushing fastening sections 54*c* of one-piece component 54, so that two slide bushings may be guided with the aid of two tie rods to prevent an undesirable rotating motion of spindle 52. A rotating motion of spindle nut 50 may thus be easily translated into the pure translatory motion of spindle 52 together with one-piece component 54.

The electromechanical brake booster of FIGS. 2*a* through 2*c* also includes as an advantageous addition a plunger 62 with a pastille part 64 fastened to or formed on same, plunger 62 being at least partially situated within spindle 52 designed as a hollow spindle. A central opening in reaction disk receiving element 18, designed as part of one-piece component 54, may be formed in such a way that pastille part 64 that protrudes through the central opening is in or may be brought into contact with reaction disk 58. Optionally, a base plate 68 may also be inserted into the receiving opening for accommodating reaction disk 58. Base plate 68 may include a central through opening through which pastille part 64 may be brought into contact with reaction disk 58. Driver brake force $F_{driver}$ exerted on the brake actuating element/brake pedal is transmitted to reaction disk 58 via plunger 62 and via pastille part 64 that is in or is brought into contact with reaction disk 58. Motor force $F_{motor}$ exerted on reaction disk 58 as well as driver brake force $F_{driver}$ transmitted to reaction disk 58 may be further conveyed to the at least one displaceable piston of the downstream master brake cylinder via an output piston 66 that is present in braking direction 56 with respect to reaction disk 58.

As is apparent in FIG. 2*a*, use of base plate 68 reduces a diameter for transmitting motor force $F_{motor}$ to reaction disk 58 compared to the related art. Thus, weld seam 57 between spindle 52 and one-piece component 54 is subjected to little or no stress by the transmission of motor force $F_{motor}$ to reaction disk 58.

A flat fitting piece 70, which extends perpendicularly away from plunger 62 and which may also be referred to as a key, is also preferably fastened to or formed on plunger 62. Plunger 62, pastille part 64, and flat fitting piece 70 may, for example, be pressed or caulked together. In addition, at least one through opening may be formed at one-piece component 54, through which a partial section of flat fitting piece 70 protrudes in each case. In this case it is advantageous when at least one protrusion 72, which is in or may be brought into contact with the partial section of flat fitting piece 70 that protrudes through the at least one through opening, is formed at spindle nut 50. The at least one protrusion 72 is preferably a protruding annular collar 72. The plastic pins, which are conventionally used to support flat fitting piece 70 on spindle nut 50, may be dispensed with at flat fitting piece 70 with the aid of the at least one protrusion 72 formed at spindle nut 50. An injection molding process for forming the plastic pins at flat fitting piece 70 is thus unnecessary. In the electromechanical brake booster of FIGS. 2*a* through 2*c*, a comparatively cost-effective component may thus be used as flat fitting piece 70. Flat fitting piece 70 may be formed from sheet metal/sheet steel, for example.

Since one-piece component 54 is preferably also formed from sheet metal/sheet steel, this results in the option to form flat fitting piece 70 and one-piece component 54 from the same material or from materials having (virtually) the same thermal expansion coefficients. The thermal expansions of flat fitting piece 70 and of one-piece component 54 are thus "compensated for."

If the electromechanical brake booster, as depicted in FIG. 2*a*, is in its unactuated state or powerless starting state, i.e., motor force $F_{motor}$ and driver brake force $F_{driver}$ are equal to zero, a distance A not equal to zero is present between flat fitting piece 70 and base plate 68, and a distance B not equal to zero is present between flat fitting piece 70 and support plate 54*a*. In the unactuated state of the electromechanical brake booster, distance A not equal to zero is fixable via the shape of base plate 68. As explained above, in the unactuated state of the electromechanical brake booster, distance B not equal to zero is fixable at spindle nut 50 via the design of the at least one protrusion 72.

As an advantageous refinement, it is also possible to mount a magnet 74, such as a rod magnet 74, on the at least one partial section of flat fitting piece 70 that protrudes through the at least one through opening. As depicted with the aid of arrow 76 in FIG. 2*c*, the fastening of magnet/rod magnet 74 may take place by simply affixing magnet/rod magnet 74 to flat fitting piece 70. Such a "subsequent" fixing of magnet/rod magnet 74 to flat fitting piece 70 is far more cost-effective than extrusion-coating magnet/rod magnet 74 with a plastic in an injection molding process, as in the related art.

A (differential) travel sensor 78 may also be fastened to one-piece component 74, adjacent to magnet/rod magnet 74. A differential travel between a first displacement travel of spindle 52 (effectuated with the aid of motor force $F_{motor}$)

together with one-piece component 54 and a second displacement travel of plunger 62 (effectuated with the aid of driver brake force $F_{driver}$) together with pastille part 64 and flat fitting piece 70 may be reliably determined by cooperation of (differential) travel sensor 78 with magnet/rod magnet 74. If flat fitting piece 70 and one-piece component 54 are formed from the same material or from materials having (virtually) the same thermal expansion coefficients, and flat fitting piece 70 and one-piece component 54 therefore do not have different thermal expansions, there is no concern for measuring errors, due to temperature fluctuations, when measuring the differential travel with the aid of (differential) travel sensor 78, even over a comparatively large temperature range from −40° C. up to 100° C.

Figure 3:
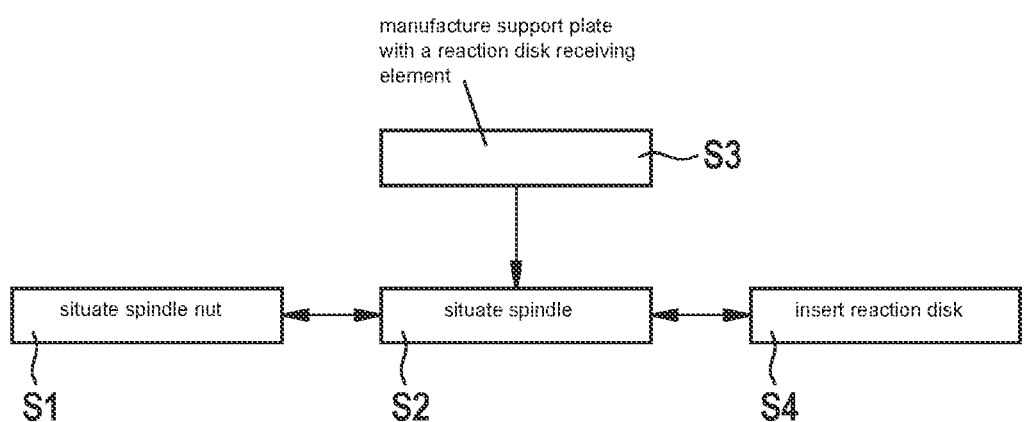
FIG. 3 shows shows a flowchart for explaining one specific embodiment of the method for manufacturing an electromechanical brake booster for a braking system of a vehicle, in accordance with the present invention.

FIG. 3 shows a flowchart for explaining one specific embodiment of the method for manufacturing an electromechanical brake booster for a braking system of a vehicle.

The electromechanical brake booster explained above, for example, may be manufactured with the aid of the manufacturing method described below. However, practicability of the manufacturing method is not limited to the manufacture of this electromechanical brake booster.

A spindle nut is situated in the subsequent electromechanical brake booster in a method step S1 in such a way that the spindle nut is moved into rotation during subsequent operation of the electromechanical brake booster with the aid of an electric motor that is intrinsic or external to the brake booster.

A spindle is situated at the spindle nut in a method step S2, and with the aid of a support plate is rotatably fixedly supported in such a way that the spindle and the support plate are moved into pure translatory motion with the aid of the spindle nut that is moved into rotation. Prior to method step S2, a method step S3 is carried out in which the support plate together with a reaction disk receiving element is manufactured as a one-piece component. For example, the support plate together with the reaction disk receiving element is formed as a one-piece component from a single piece of sheet metal. The support plate together with the reaction disk receiving element as a one-piece component is preferably punched, bent, and/or deep-drawn from the single piece of sheet metal.

A reaction disk is inserted into a receiving opening of the reaction disk receiving element in a further method step S4. Since the reaction disk receiving element is part of the one-piece component, it is also moved with the aid of the support plate that is moved into pure translatory motion, and thus achieves a force transmission between the electric motor, used for operating the electromechanical brake booster, and the reaction disk.

An electromechanical brake booster that is manufactured with the aid of method steps S1 through S4 described here achieves the advantages explained above. Method steps S1, S2, and S4 may be carried out in any order, temporally overlapping or simultaneously. The manufacturing method described here may also be refined according to the electromechanical brake booster explained above.

What is claimed is:

1. An electromechanical brake booster for a braking system of a vehicle, comprising:
    a spindle nut that is movable into rotation using an electric motor that is intrinsic or external to the brake booster;
    a spindle situated at the spindle nut and rotatably fixedly held using a support plate in such a way that the spindle and the support plate are movable into pure translatory motion using the spindle nut that is moved into rotation; and
    a reaction disk receiving element that is movable using the support plate that is moved into pure translatory motion, the reaction disk receiving element including a receiving opening in which a reaction disk is situated;
    wherein the support plate and the reaction disk receiving element are formed as a one-piece component.

2. The electromechanical brake booster as recited in claim 1, wherein the support plate together with the reaction disk receiving element as the one-piece component is formed from a single piece of sheet metal.

3. The electromechanical brake booster as recited in claim 1, wherein at least one slide bushing fastening section, in each case including a slide bushing receiving opening, is formed at an edge of the one-piece component that frames the receiving opening, at least one slide bushing being inserted into the at least one slide bushing receiving opening and being guided with the aid of a tie rod in each case.

4. The electromechanical brake booster as recited in claim 1, wherein a plunger with a pastille part that is fastened to or formed on same is situated, at least partially, within the spindle configured as a hollow spindle in such a way that the pastille part is in or may be brought into contact with the reaction disk, a flat fitting piece that extends perpendicularly away from the plunger being fastened to or formed on plunger, and at least one through opening being formed in the one-piece component, through which a partial section of the flat fitting piece protrudes in each case.

5. The electromechanical brake booster as recited in claim 4, wherein at least one protrusion that is in or may be brought into contact with the at least one partial section of the flat fitting piece that protrudes through the at least one through opening is formed at the spindle nut.

6. The electromechanical brake booster as recited in claim 4, wherein a magnet is affixed to the at least one partial section of the flat fitting piece that protrudes through the at least one through opening.

7. The electromechanical brake booster as recited in claim 6, wherein a travel sensor is fastened to the one-piece component, adjacent to the magnet.

8. A method for manufacturing an electromechanical brake booster for a braking system of a vehicle, comprising the following steps:
    situating a spindle nut in the subsequently manufactures electromechanical brake booster in such a way that the spindle nut is moved into rotation during subsequent operation of the electromechanical brake booster using an electric motor that is intrinsic or external to the brake booster;
    situating a spindle at the spindle nut, and rotatably fixedly supporting the spindle using a support plate in such a way that the spindle and the support plate are moved into pure translatory motion using the spindle nut that is moved into rotation;
    inserting a reaction disk into a receiving opening of a reaction disk receiving element that is also moved using the support plate that is moved into pure translatory motion; and
    manufacturing the support plate together with the reaction disk receiving element as a one-piece component.

9. The manufacturing method as recited in claim 8, wherein the support plate together with the reaction disk receiving element as the one-piece component is formed from a single piece of sheet metal.

10. The manufacturing method as recited in claim 9, wherein the support plate together with the reaction disk receiving element as the one-piece component is punched, and/or bent, and/or deep-drawn, from the single piece of sheet metal.

* * * * *